Oct. 27, 1942.  G. E. SWARTZ  2,300,022
SHAFT OPERATING AND LOCKING DEVICE
Filed Nov. 17, 1941
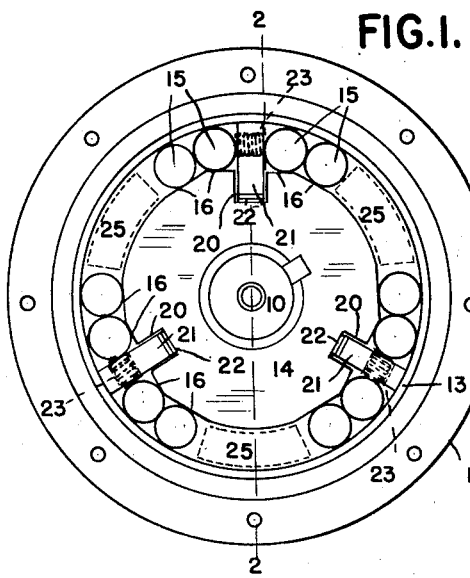
FIG. 1.
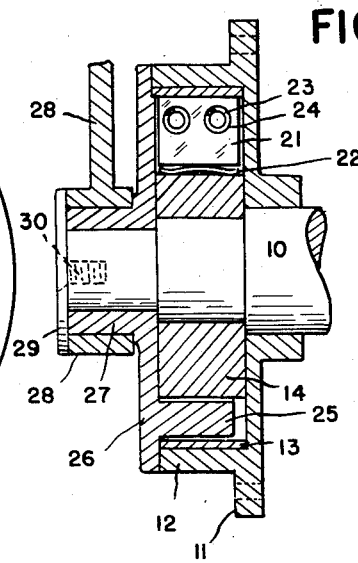
FIG. 2.
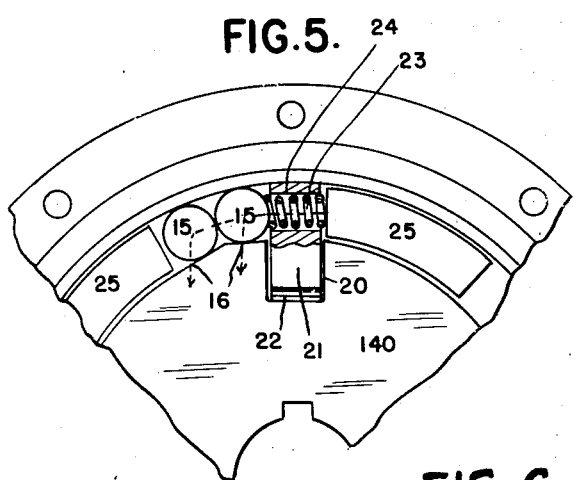
FIG. 5.
FIG. 3.
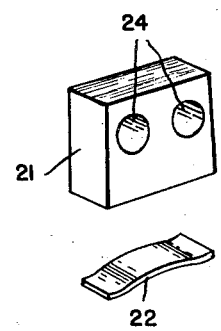
FIG. 6.
FIG. 4.
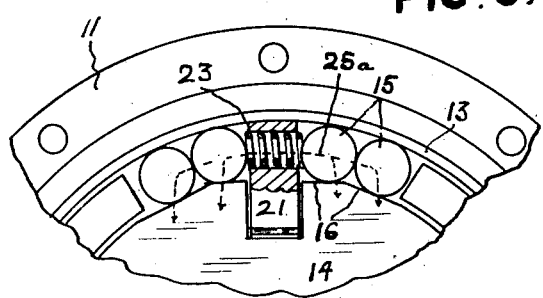
INVENTOR.
GUY E. SWARTZ
BY Swan, Fyne & Hardesty
ATTORNEYS Patented Oct. 27, 1942

2,300,022

UNITED STATES PATENT OFFICE 2,300,022

SHAFT OPERATING AND LOCKING DEVICE

Guy E. Swartz, Detroit, Mich.

Application November 17, 1941, Serial No. 419,459

4 Claims. (Cl. 192—8)

The present invention relates to devices for driving a shaft and locking it against reverse movement and relates specifically to such devices as applied to "locking fixtures" for holding work pieces while the latter are subjected to machining operations.

Driving and locking devices of the type herein described are described and claimed in U. S. Letters Patent Nos. 1,982,886, issued Dec. 4, 1934, and 2,066,167, issued Dec. 29, 1936, to the present inventor and the present invention may be considered an improvement thereon.

Among the objects of the present invention is to improve the functioning of such devices as those shown in the patents by providing braking means for holding the parts in any desired position whether or not they are in locking position.

Another object is to provide a device of the kind described that is free from "chatter" and therefore smooth in operation.

Still another object is to provide means to maintain the locking key in radial or substantially radial position and thereby permit the parts to operate at full efficiency.

Other objects will readily occur to those skilled in the art upon reference to the following description and the accompanying drawing in which Figure 1 is a view of a driving-locking device embodying the invention and shows the mechanism with the driving cover member removed.

Figure 2 is a section on the line 2—2 of Figure 1.

Figure 3 is a perspective view of a locking key.

Figure 4 is a perspective view of a key spring, and

Figure 5 is a partial view, similar to Figure 1 but showing a one-way acting device.

Figure 6 is a portion of Fig. 1 enlarged and showing the direction of the forces.

In the drawing, there is shown at 10 one end of a shaft which forms a part of a device (not shown, but which, for example, may be a locking fixture) in which, to perform its function, the shaft must be rotated and locked against return movement but which must be releasable for rotation in the opposite direction.

As indicated, the present device is constructed and arranged to receive the end of shaft 10 and is provided with a flange 11 by means of which it may be fixed to the housing of the locking fixture, or other shaft actuated device.

This flange 11 is carried by a circular housing 12, preferably provided with a hardened steel liner 13, in which is located a cam member 14 keyed to the shaft 10, the cam member being of sufficiently smaller size to provide space for locking rolls 15 and being provided with suitable cam surfaces 16 between which and liner 13 the rolls 15 may be wedged to lock the cam member against movement.

The cam member 14, at evenly spaced locations about its periphery, is provided with slots 20 in which are placed locking keys 21, each slot 20 having in its bottom a relatively stiff spring 22 constructed and arranged to exert a resilient thrust against a key 21 tending to move it radially of the cam member.

These keys 21, of which there are preferably an odd number, such as three or five, carry in suitable openings 24, helical springs 23 arranged at the proper position to press against rolls 15 and sufficiently long to contact the two rolls immediately adjacent the key and press them apart.

As shown in Figure 1, there are a pair of rolls 15 at each side of a key 21, which, with the key constitute a locking group, and between the groups a space in which is a driving finger 25.

The driving fingers 25 are carried by a cover member 26 provided with a hub portion 27, preferably hexagonal, for the reception of a suitable crank arm or wrench 28, these ports being held together by means of a suitable plate 29 and screw 30.

In the form shown in Figure 5, the cam member 140 may be identical with member 14 except that the cam surfaces 16 are on only one side of slots 20 and the rollers 15 arranged on one side of key 21.

As indicated in the drawing, the keys 21 are somewhat less in thickness than the width of the slots 20 so that without springs 22, these keys will in operation tilt somewhat.

However, with the springs 22, the keys 21 will be thrust outwardly against the liner 13 and, being maintained in a radial position, act as a braking element between cam 14 and the housing.

In the operation of the device, rotation of the handle 28 moves the cover member 26 carrying fingers 25, which contact the adjacent rolls 15 and through these exert pressure against the springs 23 which in turn act against the rolls 15 on the other side of the keys 21. The latter, in turn, act against the cam surfaces 16 and the cam to rotate the cam and shaft 10.

The dotted lines 25a in Fig. 6 show the direction of the turning forces from fingers 25 to the cam.

As soon, however, as the motion of the handle stops, the rolls 15 on the far side of key 21 immediately wedge between the surfaces 16 and liner 13 and prevent a return motion of the cam.

In the form of lock shown in Fig. 1, the device is locked against movement in either direction, unless the handle is moved.

In the form shown in Fig. 5, the locking is only in one direction.

Now having described the invention and the preferred embodiment thereof, it is to be understood that said invention is to be limited, not to the foregoing description, but only by the scope of the claims which follow.

I claim:

1. In a rotating and locking device for a shaft, a driven element secured to said shaft, a stationary housing for said driven element, locking rolls between said driven element and the wall of said housing and adapted to be wedged therebetween to lock said driven element against return movement, a radially arranged key carried by said driven element and loosely mounted therein, said key extending to and into contact with said housing, resilient means between said key and said rolls, driving means adapted to act against said rolls to drive said driven element, and means for maintaining said key in a radial position.

2. In a rotating and locking device for a shaft, a driven element secured to said shaft, a stationary housing for said driven element, locking rolls between said driven element and the wall of said housing and adapted to be wedged therebetween to lock said driven element against return movement, a radially arranged key carried by said driven element and loosely mounted therein, said key extending to and into contact with said housing, resilient means between said key and said rolls, driving means adapted to act against said rolls to drive said driven element, and means adapted to urge said key into contact with said housing for braking the relative movement between said housing and said driven element.

3. In a rotating and locking device for a shaft, a driven element secured to said shaft and provided with radial slots, a stationary housing for said driven element, locking rolls between said driven element and the wall of said housing and adapted to be wedged therebetween to lock said driven element against return movement, radially arranged keys loosely mounted in said slots and projecting into the path of said rolls, resilient means between said keys and said rolls, driving means adapted to act against said rolls to drive said driven element, and spring means in said slots constructed and arranged to press said keys against the inner wall of said housing.

4. In a rotating and locking device for a shaft, a driven element secured to said shaft and provided with radial slots, a stationary housing for said driven element, locking rolls between said driven element and the wall of said housing and adapted to be wedged therebetween to lock said driven element against return movement, radially arranged keys loosely mounted in said slots and projecting into the path of said rolls, resilient means between said keys and said rolls, driving means adapted to act against said rolls to drive said driven element, and relatively stiff leaf springs in said slots constructed and arranged to press said keys against the inner walls of said housing.

GUY E. SWARTZ.